(No Model.)
H. W. LIBBEY.
ELECTRIC BICYCLE.
No. 547,441. Patented Oct. 8, 1895.
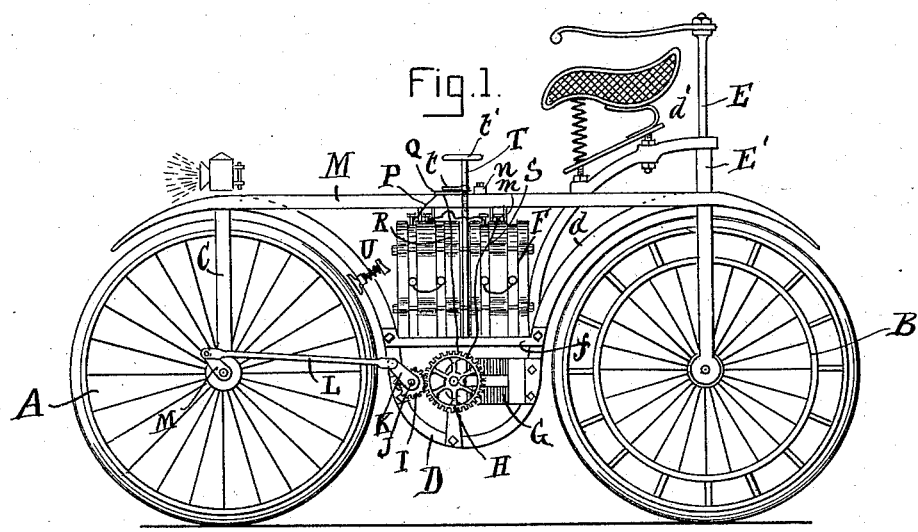
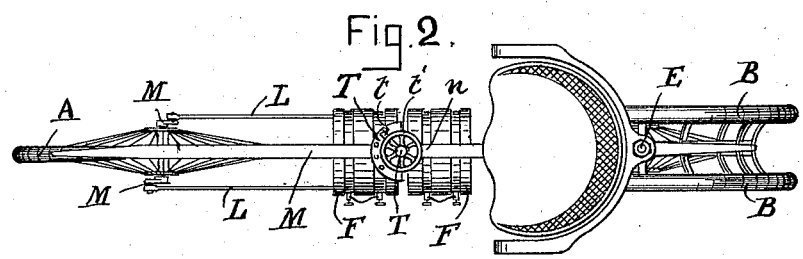
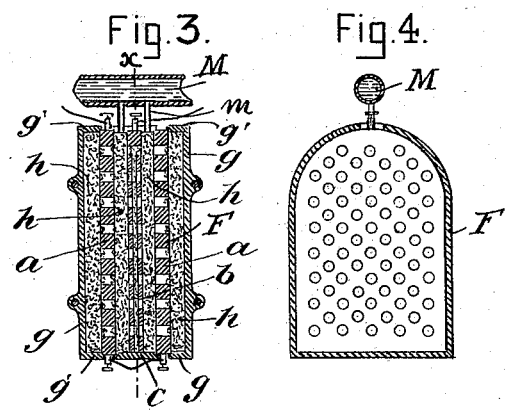
Witnesses.
Munfred L. Kerwin.
Laura E. Hayward.
Inventor.
Hosea W. Libbey
by Edwin Planta
Attorney.

UNITED STATES PATENT OFFICE.

HOSEA W. LIBBEY, OF BOSTON, MASSACHUSETTS.

ELECTRIC BICYCLE.

SPECIFICATION forming part of Letters Patent No. 547,441, dated October 8, 1895.

Application filed October 9, 1894. Serial No. 525,360. (No model.)

*To all whom it may concern:*

Be it known that I, HOSEA W. LIBBEY, a citizen of the United States, residing at Boston, in the county of Suffolk and State of Massachusetts, have invented certain new and useful Improvements in Electric Bicycles, of which the following, taken in connection with the accompanying drawings, is a specification.

The object of my invention is to produce a bicycle to be propelled by electricity.

The invention consists of a front wheel and a rear steering-wheel, having a double tread, connected together by a suitable framework, to which frame, between the wheels, is secure an electric battery and below the same an electric motor which drives a cross-shaft having a crank on each end, which cranks are connected by pitmen to the cranks on the axle of the front wheel, as hereinafter fully described, and pointed out in the claims.

Referring to the accompanying drawings, Figure 1 represents a side view of a bicycle embodying my invention. Fig. 2 is a plan or top view of the same. Fig. 3 is a vertical longitudinal section of the cells of the batteries, and Fig. 4 is a vertical section taken on line $x\ x$ of Fig. 3.

A represents the front or driving wheel, and B the rear or steering wheel, which is formed with a duplex tread, so that the vehicle will have three points of rest, whereby it will be maintained in a vertical position. I prefer to employ a wheel constructed according to a patent granted me and dated January 24, 1893, No. 490,391.

The front wheel is mounted in a vertical fork C, secured to or formed in one with the backbone D, which is preferably of the loop pattern, and at its rear end is made double or forked, the prongs $d\ d'$ of which extend over the center of the rear wheel B and embrace the upper end of the steering-post E of the fork E', in which the rear or steering wheel is mounted.

F is an electric battery supported by a cross-bar F, secured to and in the center of the loop of the backbone D. Under the battery is secured an electric motor G, the driven shaft of which is fitted at each end with a large cog-wheel H in gear with cog-wheels I on a cross-shaft J, which shaft is at each end fitted with a crank K, that is by a connecting rod or pitman L connected to a crank M on the axle of the front driving-wheel A.

I prefer to employ a battery of the construction shown, and for which I made an application for Letters Patent on the 23d day of February, 1893, Serial No. 501,098, each cell of which consists of two perforated positive elements $a$ and one negative element $b$, separated by a slotted ring $c$ of insulating material and inclosed at each end by an insulating-disk $g$, having a rim or flange $g'$ projecting inward for holding the positive elements, the spaces between the elements and between them and the outer disks being filled with suitable absorbent material $h$, all the parts being held together by bolts or other suitable means. The tube M connecting the front and rear forks forms a tank for holding the exciting-fluid, (such as diluted sulphuric acid,) and $m$ represents pipes for conducting said fluid to the absorbent material $h$ between the positive and negative elements $a\ b$.

$n$ is a small nozzle on the upper side of the tube, through which it is filled with the exciting-fluid. This nozzle is closed by a screw-cap.

The negative wire P of the battery is connected to an electrical controller Q, from which a wire R runs to the motor G, and the positive element is in connection with the motor by a wire S, the circuit being formed or broken by means of an arm $t$ upon an upright rod T, fitted at its upper end with a wheel $t'$ that stands just in front of the driver's seat. On each side of the front portion of the frame is secured a foot-rest U, which are at their inner ends connected together by a cross-bar that forms a brake which is held away from the wheel A by spiral springs when used as a foot-rest, and when the rider desires to apply the brake all he has to do is to press the foot-rests forward.

It will be seen that by this construction the vehicle is as compact as an ordinary bicycle, the battery and motor being within the loop of the frame, and by the employment of a rear wheel having a double tread three points of rest are obtained, so that the vehicle will maintain a vertical position, and by employing a battery of the construction described all the objectionable features of a liquid battery are obviated by the liquid being held in the absorbent material. The battery and motor should be inclosed in a light iron casing to keep dust and dirt from them; but I have not shown this casing, as it would conceal the parts.

What I claim is—

1. A bicycle consisting of a front driving wheel and a rear double tread steering wheel connected together by a loop frame, an electric battery and an electric motor secured to said frame between the wheels, the motor being under the battery and gears, cranks and connecting rods to transmit motion to cranks on the axle of the driving wheel substantially as set forth.

2. In a bicycle the combination with a frame of an electric battery and an electric motor secured to said frame, a longitudinal tube extending from the front to the rear fork and forming a tank to hold exciting fluid for the battery substantially as set forth.

3. In a bicycle the combination with a frame of an electric battery and an electric motor secured to said frame a longitudinal tube extending from the front to the rear fork for holding the exciting fluid for the battery, an electric controlling device, suitable connections between the battery, motor and controlling device and suitable mechanism for transmitting motion from the motor to the driving wheel substantially as set forth.

In testimony whereof I have signed my name to this specification, in the presence of two subscribing witnesses, on this 28th day of February, A. D. 1894.

HOSEA W. LIBBEY.

Witnesses:
CHAS. STEERE,
EDWIN PLANTA.